United States Patent Office
3,781,278
Patented Dec. 25, 1973

3,781,278
NOVEL p-PHENYLSTILBYL HETEROCYCLIC AND NAPHTHYL-VINYLPHENYLENE HETEROCYCLIC OPTICAL BRIGHTENERS
Adolf Emil Siegrist, Basel, Peter Liechti, Binningen, Erwin Maeder, Aesch, Basel-Land, Leonardo Guglielmetti, Birsfelden, and Hans Rudolf Meyer and Kurt Weber, Basel, Switzerland, assignors to Ciba-Geigy AG, Basel, Switzerland
No Drawing. Continuation-in-part of abandoned application Ser. No. 588,318, Oct. 21, 1966. This application Aug. 28, 1970, Ser. No. 68,014
Claims priority, application Switzerland, Oct. 28, 1965, 14,902/65; July 4, 1966, 9,649/66
Int. Cl. C09b 23/00
U.S. Cl. 260—240 CA                 6 Claims

ABSTRACT OF THE DISCLOSURE

The present invention relates to new compounds of the formula (I)
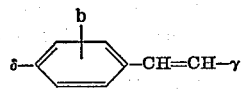

in which $b$ represents a hydrogen atom or a methyl group, $\gamma$ represents a diphenyl or 1-naphthyl or 2-naphthyl residue and $\delta$ denotes a residue of the series

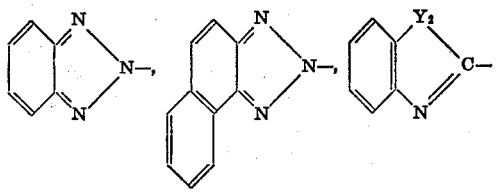

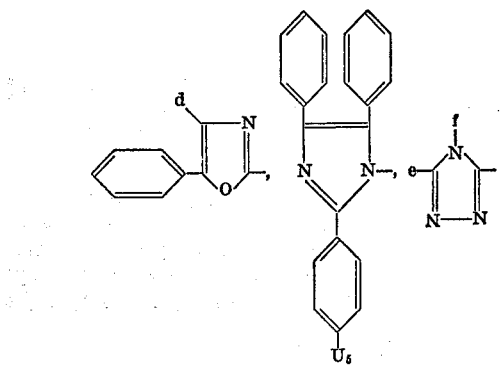

where (I) $d$ represents hydrogen or phenyl, $e$ and $f$ represent phenyl, stilbenyl, p-phenylstilbenyl or benzostilbenyl, and furthermore $Y_2$ represents a bridge member —O— , —NH— or —N(alkyl)—, where (II) $U_5$ denotes hydrogen, a styryl residue or a p-phenylstyryl residue, and where (III) terminal phenyl or naphthyl residues may contain alkyl, halogen or alkoxy groups. These new compounds represent valuable optical brightening agents.

CROSS-REFERENCE TO RELATED APPLICATION

This application is a continuation-in-part of copending application Ser. No. 588,318 filed Oct. 21, 1966, now abandoned and refiled as streamline continuation Ser. No. 142,388 on May 11, 1971, now U.S. Pat. 3,732,221 issued May 8, 1973.

The present invention relates to a new class of stilbene derivatives which are valuable optical brightening agents. The new compounds correspond to the general formula (1)
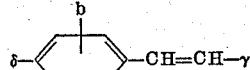

in which $b$ represents a hydrogen atom or a methyl group, $\gamma$ represents a diphenyl, 1-naphthyl or 2-naphthyl residue, and $\delta$ denotes a residue of the series

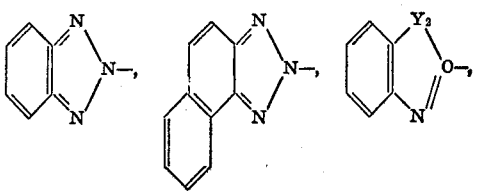

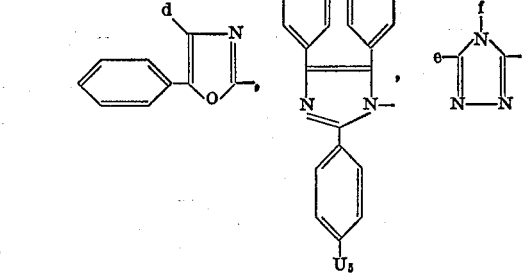

where (I) $d$ represents hydrogen or phenyl, $e$ and $f$ represent phenyl, stilbenyl, p-phenylstilbenyl or benzostilbenyl, and furthermore $Y_2$ represents a bridge member —O—, —NH— or —N(alkyl)—, wherein (II) $U_5$ denotes hydrogen, a styryl residue or a p-phenylstyryl residue, and wherein (III) terminal phenyl or naphthyl residues may contain 1 to 3 alkyl groups, 1 to 2 halogen atoms or an alkoxy group.

Within the above class of compounds the following subgroups of compounds are of special practical importance:

(I) Compounds of the formula (2)
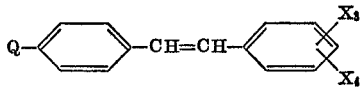

in which the symbol Q represents a 2-oxazole or benzthiazole residue and $X_3$ and $X_4$ denote branched alkyl groups, or one of the substituents $X_3$ and $X_4$ denote branched alkyl groups, or one of the substituents $X_3$ and $X_4$ denotes a phenyl group or two adjacent substituents $X_3$ and $X_4$ denote a condensed-on carbocyclic ring.

(II) Compound of formula (3)
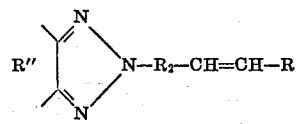

in which R″ denotes a benzene or naphthalene ring condensed with the triazole ring in the manner indicated by the valency lines, $R_2$ denotes a benzene residue bonded to the triazole ring and the —CH= group in the 1,4-position and R denotes a diphenyl or naphthyl group.

(III) Oxazole compounds of formula (4)
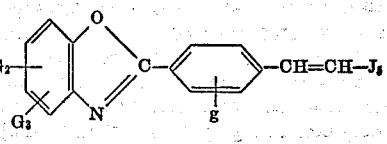

in which $G_2$ denotes hydrogen, an alkyl group having 1 to 4 carbon atoms, a phenyl group, a phenylalkyl group with 1 to 4 carbon atoms in the alkyl group, halogen or a sulphonamide group, $G_3$ represents hydrogen or an alkyl group or may, together with an adjacent residue $G_2$ and the benzene ring to which these G-residues are attached, form a naphthalene ring, $g$ represents hydrogen or methyl and $J_5$ denotes a diphenyl, 1-naphthyl or 2-naphthyl residue, wherein terminal phenyl or naphthyl residues may additionally contain 1 to 3 alkyl groups, 1 to 2 halogen atoms or an alkoxy group.

(IV) Benzthiazole compounds of formula (5)
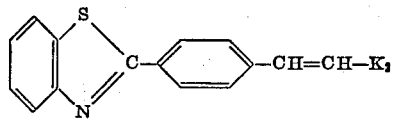

in which $K_2$ represents a diphenyl residue or a 1-naphthyl or 2-naphthyl residue.

(V) Compounds of formula (6)
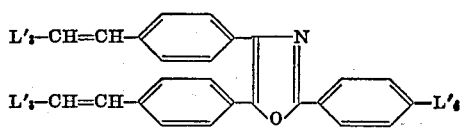

in which $L'_3$ denotes a diphenyl or naphthyl residue and $L'_4$ hydrogen, a styryl residue or a p-phenylstyryl residue.

(VI) Compounds of formula (7)
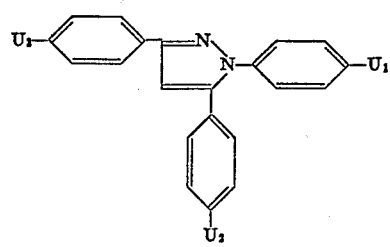

in which $U_1$, $U_2$ and $U_3$ denote a hydrogen atom, a styryl residue or a phenylstyryl residue and at least one symbol U differs from hydrogen.

(VII) Compounds of the formula (8)
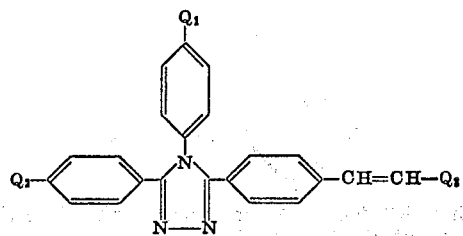

in which $Q_1$ and $Q_2$ represent a member selected from the group consisting of a hydrogen atom, a styryl residue, a p-phenyl-styryl residue and a benzostyryl residue, $Q_3$ denotes a member selected from the group consisting of a phenyl residue, a diphenyl residue and a naphthyl residue and terminal phenyl or naphthyl residues may further carry halogen atoms, alkoxy groups or alkyl groups (preferably containing up to 4 carbon atoms).

(VIII) Compounds of the formula (9)
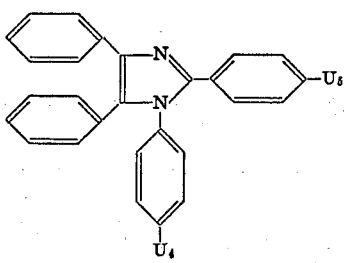

in which $U_4$ and $U_5$ denote a member selected from the group consisting of a hydrogen atom, a styryl residue, a p-phenyl-styryl residue and a benzostyryl residue, but at least one of the U-residues differs from hydrogen.

In these formulae possible alkyl groups in principle also include long chain alkyl groups, but in practice it is mostly alkyl groups containing up to about 8 carbon atoms, preferably 1 to 4 carbon atoms, and especially branched-chain alkyl groups, which require consideration.

Though again in the case of alkoxy groups higher members, that is to say those containing 4 or more carbon atoms, as well as polyalkyleneoxy groups, are possible, the predominant practical significance resides in alkoxy groups containing 1 to 4 carbon atoms. Amongst the halogens quoted, chlorine is of especial interest.

The compounds of General Formula 1, and subordinated formulae are valuable optical brighteners (provided they do not contain any chromophoric groups).

From the point of view of use as optical brighteners for the most varied organic materials in which optical brighteners are desirable, the following types of compounds are of preferred interest:

(a) Compounds of formula

(10)
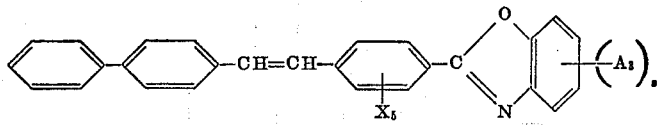

in which $A_3$ represents hydrogen, an alkyl group having 1 to 18 carbon atoms, an aryl residue, especially a phenyl residue, an aralkyl residue (especially a phenyl-$C_{1-4}$-alkyl residue) or a halogen atom and $s$ denotes an integer from 1 to 3, preferably 1, and $X_5$ represents hydrogen, alkyl or halogen.

(b) Compounds of formula

(11)
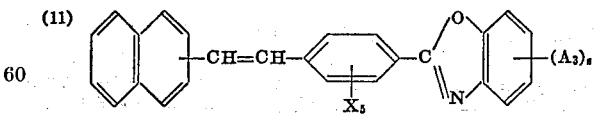

in which $A_3$ represents hydrogen, an alkyl group having 1 to 18 carbon atoms, an aryl residue, especially a phenyl residue, an aralkyl residue especially a phenyl-$C_{1-4}$-alkyl residue or a halogen atom and $s$ denotes an integer from 1 to 3, preferably 1, and $X_5$ represents hydrogen, alkyl or halogen.

(c) Compounds of formula

(12)
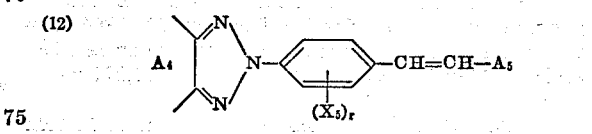

in which $A_4$ represents the remainder of the benzene or naphthalene ring, $A_5$ denotes a diphenylyl or naphthyl residue, $X_5$ represents hydrogen, alkyl or halogen and $r$ represents 1 or 2.

(d) The compound of the formula

(13)
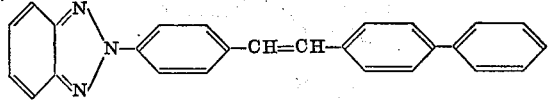

(e) Compounds of the formula

(14)
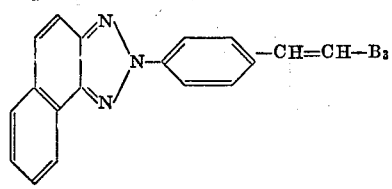

wherein $B_3$ represents a member selected from the group consisting of p-chlorophenyl, 4-diphenylyl, 1-naphthyl, 2-naphthyl, m-chlorophenyl, 3,4-methylenedioxy-phenyl.

(f) Compounds of the formula

(15)
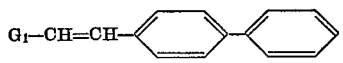

wherein $G_1$ represents 4-(benzoxazolyl-2)-phenyl or 4-(naphthoxazolyl-2)-phenyl, wherein the 4-(benzozazolyl-2)phenyl may be substituted in position 5 by phenyl, methyl, isopropylphenyl, tert.butyl or N-octyl-sulphonamido group, and in position 6 by phenyl or methyl.

(g) Compounds of the formula

(16)
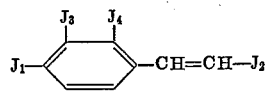

wherein $J_1$ is a member selected from the group consisting of 5-phenyl-benzoxazolyl-(2), 6-phenyl-benzoxazolyl-(2), 5 - tert.butyl-benzoxazolyl - (2), benzoxazolyl - (2) and naphthoxazolyl - (2), $J_2$ is a member selected from the group consisting of 1-naphthyl and 2-naphthyl and $J_3$ and $J_4$ each represents a member selected from the group consisting of hydrogen and methyl.

(h) The compounds of the formula

(17)
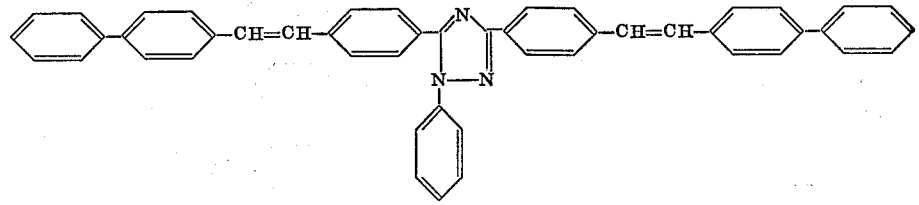

The compounds according to this invention and defined above are generally prepared by the process for manufacture of heterocyclic compounds containing ethylene double bonds as described in U.S. patent application Ser. No. 588,318, filed Oct. 21, 1966.

This process is characterized by reacting a compound of formula

(18)
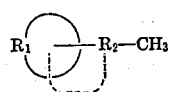

in which $R_1$ represents a heterocyclic ring system of aromatic character which (a) contains one to two 5-membered or 6-membered heterocyclic rings with one to three ring nitrogen atoms, any other hetero atom in the ring being no more than one sulfur or oxygen atom and such heterocyclic rings with a condensed-on benzene or naphthalene ring, (b) is free of hydrogen atoms which (1) are bonded to ring nitrogen atoms and (2) which are replaceable by alkali metal, and (c) is bonded to a ring member of $R_2$ by means of a ring member or has two adjacent ring members in common with two adjacent ring members of $R_2$, in which $R_2$ denotes a carbocyclic or heterocyclic rings system of aromatic character which contains 6 ring members, and which optionally is condensed with further aromatic or hydroaromatic ring systems, and in which (b) the methyl group shown in the formula is in a p-position to the bond to $R_1$, is reacted with a Schiff base in the presence of a strongly basic alkali compound, with the reaction medium to be used being dimethylformamide and being practically anhydrous, except in the case of the use of an alkali hydroxide as the strongly basic alkali compound in which case the alakil hydroxide may have a water content of up to 25%.

Within the framework of this process one type of reaction according to Formula 18 is of importance.

The reaction of anils of aldehydes of aromatic character, in the manner described above with compounds of formula

(19)
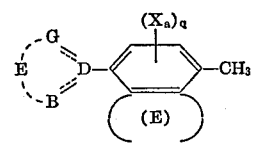

in which formula (a) G, B and D each denotes a ring atom of a 5-membered or 6-membered ring system of aromatic character, with at least one of the symbols G, B and D representing a nitrogen atom, and where D may instead of nitrogen also denote a carbon atoms and G as well as B may represent carbon, nitrogen, oxygen or sulphur atoms in the arrangement of ring systems which are in themselves known, (b) E represents the ring member supplementation to give a 5-membered or 6-membered ring system of aromatic character, containing carbon, nitrogen, oxygen or sulphur atoms in the arrangement of ring systems which are in themselves known, and in which (c) the rings which are formed conjointly with the symbol E may contain further substituents, which like the substituent $X_a$ do not contain any atoms which may be replaced by alkali, especially hydrogen atoms, and $p$ represents the numbers 0 or 1 and $q$ the numbers 0, 1, 2 or 3.

The aforementioned substituents may be of any desired aliphatic, cycloaliphatic araliphatic or aromatic nature or may represent functional substituents (e.g. carboxylic acid ester groups and the like) as long as they fulfill the preceding condition.

The above-defined reaction is based in principle on a reaction of the methyl group of compounds of formula category (18) with the azomethine grouping of a Schiff base (for example benzalaniline) with elimination of the amino components, according to the following scheme:

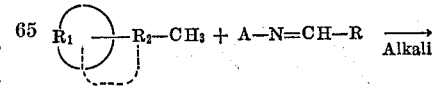

(18)    (20)

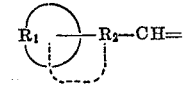

(21)    (22)

Here $R_1$ and $R_2$ have the significance given above, A—N= represents an amine residue and =CH—R represents an aldehyde residue, in which R denotes a residue of an aldehyde of aromatic character.

The heterocyclic ring system R₁ may consist of one or more rings. At the same time it is a prerequisite in all cases that this ring system R₁ should contain a hetero-cyclic ring, having 5 to 6 ring members and containing ring nitrogen atoms, this ring in turn being bonded to R₂, and in fact either (a) in such a way that one ring atom of this heterocyclic ring is bonded to a ring atom of R₂ by means of one bond, or (b) that this heterocyclic ring has two, in each case adjacent, ring atoms in common with R₂, that is to say that it forms a condensed ring system. The statement that the ring system R₁ may consist of one or more rings, denotes that for example (a) R₁ consists only of one heterocyclic ring having 5 to 6 ring members and containing ring nitrogen atoms, or (b) a heterocyclic compound as defined under (a) contains further carbocyclic rings (especially 6-rings) condensed to it (preferably a benzene or naphthalene ring), or (c) a heterocyclic compound as defined under (a) contains further aromatic rings of carbocyclic or heterocyclic nature bonded via a single valence (that is to say not condensed), or (d) a heterocyclic compound as defined under (a) is condensed with further heterocyclic rings, in which case hetero-atoms may also be common to two rings, or (e) combinations of the above-mentioned variante with one another.

One of the reagents to be used for the process of the invention, namely the compound according to Formula 18 is capable of very broad variation within the framework of the definition given above.

Suitable starting materials for preparing the compounds according to this invention are compounds of formula

(23) 

in which R₁ denotes a heterocyclic ring system which contains at least one 5-membered to 6-membered heterocyclic ring with a ring member which is directly bonded to R₂ and a nitrogen atom which is exclusively bonded into the ring, and R₂ represents a benzene residue or naphthalene residue bonded to R₁ and to the H₃C-group in the 1,4-position. Here the ring system R₁ preferably consists of a 5-membered to 6-membered heterocyclic ring and a benzene or naphthalene ring condensed with this ring, with the rings referred to again being able to have further substituents, as may be the case for compounds of formula

(24) 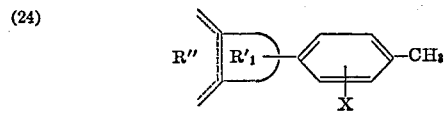

in which R″ denotes a benzene residue or naphthalene residue condensed with R′₁ in the manner indicated by the valency lines, R′₁ denotes a 5-membered to 6-membered heterocyclic ring with a ring member directly bonded to the methylphenyl residue and with at least one nitrogen atom exclusively bonded into the ring, and X denotes a hydrogen atom, a chlorine atom, a methoxy group or a methyl group. Possible compounds are especially triazole, oxazole and diazine compounds, for example compounds of formulae

(25) 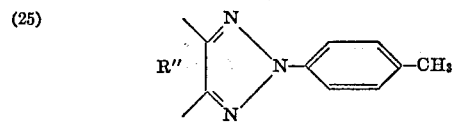

and

(26) 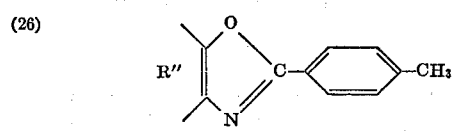

in which R″ denotes a benzene or naphthalene ring, condensed with the triazole or oxazole ring in the manner indicated by the valency lines.

Suitable starting materials are for example:

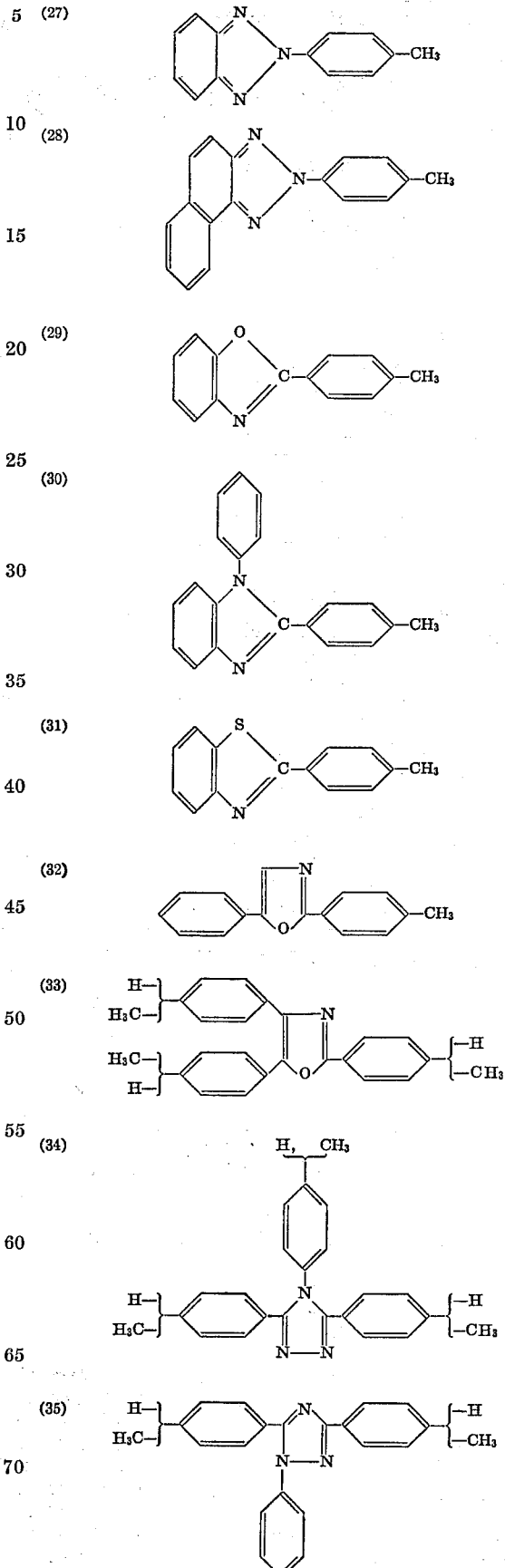

(36) 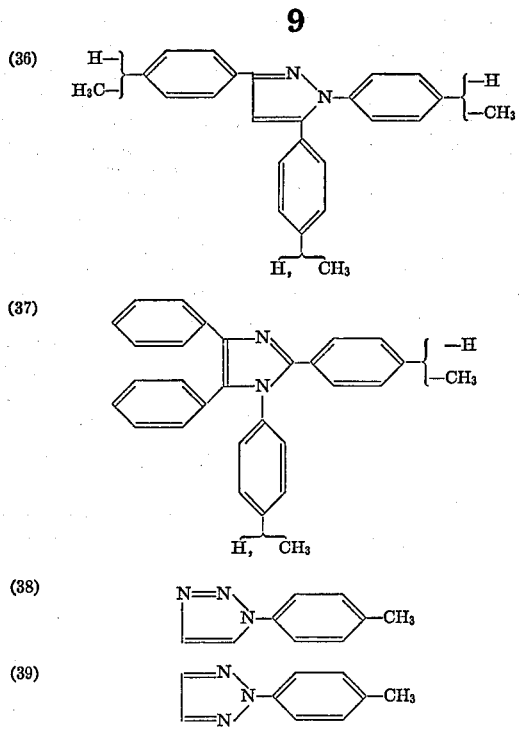

(37)

(38) 

(39)

Additionally, the following explanations apply to the preceding formulae:

(1) Terminal phenyl residues may additionally contain further substituents of the alkyl series (especially having 1 to 4 carbon atoms), the halogen series (especially chlorine) or the alkoxy series (especially those having 1 to 4 carbon atoms). (2) Phenyl residues on s-triazine rings may additionally contain methyl groups. (3) Amongst substitution products of compounds according to Formula 19 there are also to be included the corresponding 6-phenyl-benzoxazoles as well as the analogous 1-naphthoxazoles and 2-naphthoxazoles. (4) The symbol

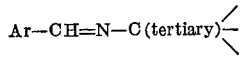

denotes that either a hydrogen atom or a methyl group, but in the entire molecule at least one methyl group should be present.

As may be seen from the preceding compilation, all p-methylphenyl derivatives of nitrogen-containing heterocyclics of aromatic character are in principle accessible to the reaction of the invention and, summarizing, the most important categories should again be pointed out, namely such derivatives of pyrrole, pyrazoles, triazoles (1,2,3-, 1,2,4- or 1,3,4), tetrazole, pyridine, pyrimidine, pyrazine, quinazoline quinoxaline, quinolines, triazines (1,3,5-, 1,2,4-, 1,2,3-), oxidazoles (1,2,4-, 1,3,4) benzoxazoles and naphthoxazoles, (iso)oxazoles, imidazoles as well as the corresponding ring systems which are condensed with benzene or naphthalene rings, where these have not already been named.

The Schiff base to be used as the second reagent in the present process must, as will be obvious, be free of reactive methyl groups, for example those in the p-position to the azomethine grouping. Possible Schiff bases are, in turn, the (known) condensation products of aldehydes of aromatic character with primary amines (of aliphatic, aromatic or heterocyclic nature), whose amino group is bonded to a tertiary carbon atom. Compounds of this type may accordingly be written as azomethine compounds of formula Ar—CH=N—C(tertiary)

in which Ar denotes an aromatic residue. In this, either one or both of the components required for the synthesis of the Schiff bases (aldehyde and amine) may contain further substituents, provided the above restriction is observed. Since the amine, especially aniline, residue is split off during the reaction and is no longer present in the final product, the presence of substituents in this is generally not indicated and is uninteresting. Nevertheless substituents which do not interfere with, or hinder, the reaction, for example chlorine atoms, may be present in this ring also. The benzene residue bonded to the =HC— group may for example carry halogen atoms such as bromine or chlorine or alkoxy groups such as methoxy or ethoxy. Preferred interest attaches to Schiff bases of aromatic aldehydes with anilines, that is to say aromatic aldehyde-anils. Such anils for example correspond to the formula

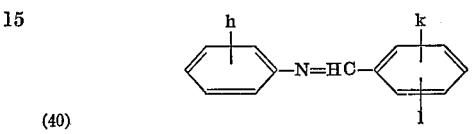

(40)

in which $k$ and $l$ may be identical or different and denote hydrogen atoms, chlorine atoms or methoxy groups and in which $h$ represents chlorine or, preferably, hydrogen. Adjacent $k$ and $l$ may together also form a

—O—CH$_2$—O— group. Another important variant of aromatic anils corresponds to the formula

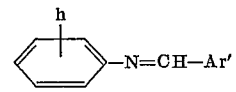

(41)

in which $h$ (as above) represents a hydrogen atom or chlorine and Ar' denotes a naphthyl or diphenyl residue. As monoaldehydes suitable for the synthesis of these Schiff bases there may be quoted for example: aldehydes of the benzene series such as benzaldehyde or its halogenated analogues, such as the monochloro-analogues and dichloro-analogues, alkoxybenzaldehydes such as p-methoxy-benzaldehyde, alkylated benzaldehydes, provided these do not contain any p-methyl groups, such as toluyl-aldehyde, xylyl-aldehyde and cumoyl-aldehyde, methylenedioxy-benzaldehyde (piperonal), 4-dimethylamino-benzaldehyde, 4-diethylamino-benzaldehyde, and diphenyl-aldehyde; aldehydes of the naphthalene series such as α- and β-naphthaldehyde, and heterocyclic aldehydes such as for example furfurol and thiophenaldehyde.

As suitable amines there may be named, by way of example, the anilines, naphthylamines or, as an aliphatic representative, tert.butylamine.

Compounds of Formula 18 are reacted with the aldehydeanils in the presence of dimethylformamide.

The reaction furthermore requires a strongly basic alkali compound. By the term strongly basic alkali compounds there are to be understood, within the framework of the present invention, such compounds of the alkali metals ((I) main group of the Periodic Table of Elements) including ammonium as have a basic strength of at least about that of lithium hydroxide. Accordingly, they may be compounds of lithium, sodium, potassium, rubbidium, caesium or ammonium of, for example, the alcoholate, hydroxide, amide, hydride, sulphide or strongly basic ion exchanger types. Potassium compounds of composition

(42)  KOC$_{m-1}$H$_{2m-1}$ in which $m$ denotes an integer of 1 to 6, such as for example potassium hydroxide or potassium tertiary-butylate, are advantageously used (above all when mild reaction conditions as regards reaction temperature appear to be indicated). In the case of alkali alcoholates and alkali amides (and hydrides) it is here necessary to work in a practically anhydrous medium, whereas in the case of alkali hydroxides water contents of up to 25% (for example contents of water of crystallization) are admissible. In the case of potassium hydroxide a water content of up to about 10% has proved appropriate. As examples of other alkali compounds which may be used there may be quoted sodium methylate, sodium hydroxide, sodium amide, lithium amide, lithium hydroxide, rubidium hyroxide, caesium hdyroxide and the like. Of course it is also possible to work with mixtures of such bases.

In accordance with the preceding explanation, an embodiment of the present invention which is important in practice consists of reacting anils of aldehydes of the benzene and naphthalene series with compounds which correspond to the formula

(43)
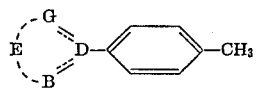

in which formula (a) G, B and D each denote a ring atom of a 5-membered or 6-membered ring system of aromatic character, with at least one of the symbols G, B and D representing a nitrogen atom, where D may, instead of nitrogen, also denote the carbon atom and G as well as B may represent carbon, nitrogen, oxygen or sulphur atoms in the arrangement of ring systems which are in themselves known, (b) E represents the ring member supplementation for a 5-membered or 6-membered ring system of aromatic character containing carbon, nitrogen, oxygen or sulphur atoms in the arrangement of ring systems which are in themselves known, and in which (c) the ring formed together with the symbol E may contain further substituents which do not contain any atoms, particularly hydrogen atoms, which are replaceable by alkali, this reaction being carried out in the presence of an alkali compound having a basic strength of at least that of lithium hdyroxide, preferably potassium tertiary-butylate or potassium hydroxide and in dimethylformamide as solvent.

It is appropriate to react the compounds of Formula 18 with the aldehyde-anils in equivalent amounts, so that no component is present in significant excess. As regards the alkali compound, it is advantageous to use at least the equivalent amount, that is to say at least 1 mole, of a compound having, for example, a KO group per mole of aldehyde-anil. When using potassium hydroxide a 4-fold to 8-fold amount is preferably employed.

The reaction of the invention may generally be carried out at temperatures in the range of between about 10 and 150° C. If alcoholates are used as the potassium compound in the reaction, then the application of heat is generally not necessary. The procedure is, for example, that the aldehyde-aniline is added to the mixture of the compound of Formula 18, the solvent and the potassium alcoholate, preferably with stirring and with exclusion of air, at a temperature of between 15 and 30° C., whereupon the reaction takes place of its own accord, with a slight temperature rise. When using potassium hydroxide it is frequently necessary to work at higher temperatures. For example the reaction mixture is slowly warmed to 30–100° C. and then kept at this temperature for some time, for example ½ to 2 hours. The products may be worked up from the reaction mixture by usual methods which are in themselves known.

The categories of compounds emphasised above as regards their brightener effect possess a more or less pronounced fluorescence in the dissolved or finely divided state. They are suitable for optical brightening of the most diverse organic materials of natural or synthetic origin, or of materials containing such organic substances for which optical brightening is relevant. As such materials there may for example be quoted the following group of organic materials, without the recital which follows in any way being intended to express any limitation in this respect:

(I) Synthetic organic hight molecular materials such as (A) polymerization products based on organic compounds containing at least one polymerizable carbon-carbon double bond (homopolymers or copolymers as well as their post-treatment products such as cross-linking products, graft products or degradation products, polymer dilutions and the like), as examples of which there may be quoted: polymers based on α,β-unsaturated carboxylic acids (for example acrylic compounds), olefine hydrocarbons, vinyl and vinylidene compounds, halogenated hydrocarbons, unsaturated aldehydes and ketones, allyl compounds and the like; furthermore polymerization products such as are obtainable by ring opening (for example polyamides of the polycaprolactam type), furthermore formaldehye polymers, or polymers which are obtainable both by polyaddition and by polycondensation such as polythioethers, polyacetals and thioplastics. (B) Polycondensation products or precondensates based on bifunctional or polyfunctional compounds with groups capable of condensation, their homocondensation and cocondensation products as well as post-treatment products (for example saturated and unsaturated, unbranched or branched, polyesters), polyamides, maleate resins, their pre-condensates and products of analogous structure, polycarbonates, silicone resins and others; (G) polyaddition products such as polyurethanes (cross-linked and uncross-linked) or epoxide resins.

(II) Semi-synthetic organic materials such as for example cellulose esters, nitrocellulose, cellulose ethers, regenerated cellulose or their post-treatment products, and casein plastics.

(III) Natural organic materials with animal or vegetable origin, for example based on cellulose or on proteins such as wool, cotton, silk, leather, wood compositions in a finely divided form, natural resins, and furthermore rubber, guttapercha, balata as well as their post-treatment products and modification products.

The organic materials requiring consideration may be present in the most diverse processing states (raw materials, semi-finished goods or finished goods) and states of aggregation. They may thus be present in the form of the most diverse shaped articles, for example as sheets, profiles, injection mouldings, chips, granules, and foams; films, foils, lacquers, strips, coverings, impregnations and coatings or filaments, fibres, flocks, bristles and wires The materials quoted may on the other hand also be present in an unshaped state in the most diverse homogeneous and inhomogeneous forms of distribution and states of aggregation, for example as powders, solutions, emulsions, dispersions, sols, gels, putties, pastes, waxes, adhesives and trowelling compositions and the like.

Fibre materials may for example be present as continuous filaments, staple fibres, flocks, hanks, yarns, threads, fibre fleeces, felts, waddings, flocked structures, woven textile fabrics or laminates, knitted fabrics as well as papers, cardboards or paper compositions and the like.

When used as brighteners, these compounds may be added to the materials quoted either before or during shaping. Thus, for example, they may be added to the moulding composition in the manufacture of films or other moulded articles, or they may be dissolved, dispersed or otherwise finely divided in the spinning composition before spinning. The optical brighteners may also be added to the starting substances, reaction mixtures or intermediate products for the manufacture of fully synthetic or semi-synthetic organic materials, that is to say also before or during the chemical reaction, for example in the case of a polycondensation, a polymerization or a polyaddition.

The new optical brighteners may of course also be employed in all cases where organic materials of the type indicated above are combined with inorganic materials in any form. They are distinguished by exceptionally good heat stability, light fastness and resistance to migration.

The amount of the new optical brighteners to be used, relative to the material to be optically brightened, may vary within wide limits. A clear and durable effect can already be achieved with very small amounts, in some cases for example with amounts of 0.001 percent by weight. However amounts of up to about 0.5 percent by weight and more may also be used. For most practical purposes amounts of between 0.01 and 0.2 percent by weight are preferably of interest.

The compounds serving as brighteners may for example also be employed as follows: (a) mixed with dyestuffs or pigments or as an additive to dye baths, printing, etching or reserve pastes. Further also for the post-treatment of dyeing, prints or discharge prints; (b) mixed with so-called "carriers," antioxidants, light protection agents, heat stabilizers, chemical bleaching agents or as an additive to bleaching baths; (c) mixed with cross-linking agents, finishing material such as starch or synthetically produced finishes; (d) in combination with detergents, where the detergent and the brightener may be separately added to the wash baths to be used, or preferably detergents are used which contain the brightener mixed into them; (e) in combination with polymeric carries (polymerization, polycondensation or polyaddition products), in which the brighteners are optionally introduced alongside other substances in a dissolved or dispersed form, (f) as additives to the most diverse industrial products in order to make these more marketable or to avoid disadvantages in their usability, for example as an additive to glues, adhesives, paints and the like.

The compounds which have been emphasized as optical brighteners may also be used as scintillators for various photographic purposes, such as for electrophotographic reproduction or for super-sensitization.

In the tables which follow later on, symbols have the following significance:

Column I=formula number
Column II=structural elements
Column III=crude yield in percent
Column IV=recrystallization medium, with these being designated by the numbers listed below: 1=water, 2=ethanol, 3=dioxane, 4=dimethylformamide, 5=tetrachlorethylene, 6=chlorobenzene, 7=o-dichlorobenzene, 8=trichlorobenzene, 9=toluene, 10=n-hexane, 11=xylene.
Column V=color of the purified reaction of product, with the latter having been designated by the numbers listed below: 1=colorless, 2=almost colorless, 3=pale green 4=light green, 5=pale yellow, 6=light yellow, 7=yellow, 8=pale greenish yellow, 9=light greenish yellow, 10=greenish yellow.
Column VI=melting point (uncorrected) in ° C.
Column VII=elementary formula and analytical data (upper line calculated, lower line found).

The starting materials (or the methods for their preparation) to be used for preparing the compounds in the following examples are known in the are (see Helvetica Chimia Acta, vol. 50, Fasc. 3, pages 946 to 957).

Example 1

12.96 g. of the compound of formula (44)

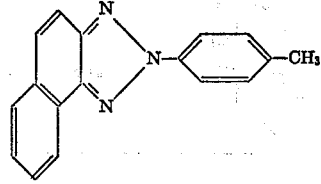

9.1 g. of benzalaniline and 25 g. of potassium hydroxide powder containing about 10% of water are stirred into 300 ml. of dimethylformamide with exclusion of air, during which a red coloration gradually develops. The temperature is raised to 60° C. over the course of 30 minutes, and the mixture stirred for a further 30 minutes at this temperature and then cooled to room temperature. 100 ml. of water and 240 ml. of 10% hydrochloric acid are now successively added dropwise. The precipitated reaction product is washed with a great deal of water and thereafter with 80 ml. of methanol, and is dried. About 15.7 g., corresponding to 90.5% of theory, of the naphthtriazole derivative of formula (45)

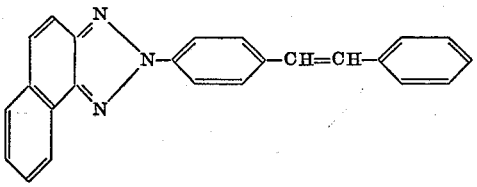

are obtained in the form of a beige powder which melts at 173.5 to 174° C. Three recrystallizations from tetrachlorethylene with the aid of Fuller's earth yield pale greenish yellow glistening platelets of melting point 182 to 182.5° C. Analysis: $C_{24}H_{17}N_3$ (437.40). Calculation: C, 82.97; H, 4.93; N, 12.10. Found: C, 83.07; H, 4.94; N, 12.09.

The naphthtriazole derivatives of formula (46)

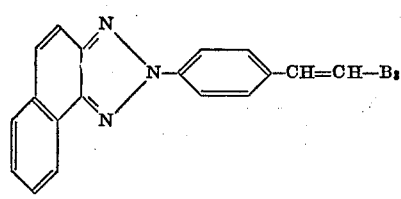

listed in the following table may be prepared in a similar manner.

| I | II, B₃ | III | IV | V | VI | VII | | |
|---|---|---|---|---|---|---|---|---|
| 47 | —⟨⟩—OCH₃ | 91.2 | 5 | 8 | 215–215.5 | $C_{25}H_{19}ON_3$ C, 79.55 C, 79.34 | H, 5.07 H, 5.07 | N, 11.13 N, 11.17 |
| 48 | —⟨⟩—Cl | 86.5 | 5 | 9 | 237.5–238 | $C_{24}H_{16}N_3Cl$ C, 75.49 C, 75.29 | H, 4.22 H, 4.04 | N, 11.00 N, 10.91 |
| 49 | —⟨⟩—⟨⟩ | 92.6 | 7 | 9 | 255–256 | $C_{30}H_{21}N_3$ C, 85.08 C, 84.98 | H, 5.00 H, 4.86 | N, 9.92 N, 10.07 |
| 50 | (naphthyl) | 94.6 | 5 | 10 | 215–215.5 | $C_{28}H_{19}N_3$ C, 84.61 C, 84.43 | H, 4.82 H, 4.86 | N, 10.57 N, 10.58 |
| 51 | (naphthyl) | 79.5 | 5 | 9 | 236.5–237 | $C_{28}H_{19}N_3$ C, 84.61 C, 84.85 | H, 4.82 H, 5.00 | N, 10.57 N, 10.64 |

TABLE—Continued

| I | II, B₃ | III | IV | V | VI | VII | | |
|---|---|---|---|---|---|---|---|---|
| 52 | 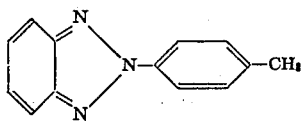 | 66.0 | 5 | 8 | 182–182.5 | C, 75.49<br>C, 75.32 | $C_{24}H_{16}N_3Cl$<br>H, 4.22<br>H, 4.42 | N, 11.00<br>N, 11.09 |
| 53 | 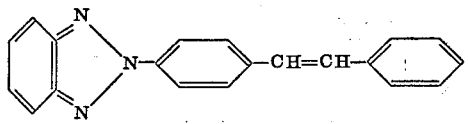 | 84.4 | 2/4 | 5 | 173.5–174 | C, 83.26<br>C, 82.88 | $C_{27}H_{23}N_3$<br>H, 5.95<br>H, 5.99 | N, 10.79<br>N, 10.83 |
| 54 | 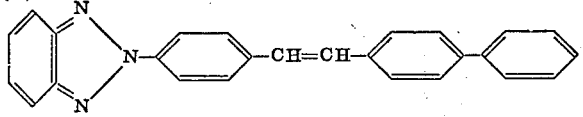 | 69.5 | 5 | 9 | 232–233 | C, 76.71<br>C, 76.89 | $C_{25}H_{17}O_2N_3$<br>H, 4.38<br>H, 4.47 | N, 10.74<br>N, 10.77 |

Example 2

5.19 g. of the benztriazole derivative of formula

(55) 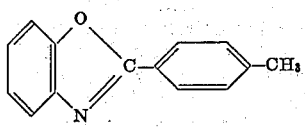

(melting point: 119.5 to 120° C., 4.53 g. of benzalaniline and 12.5 g. of potassium hydroxide powder containing about 10% of water are reacted in 150 ml. of dimethylformamide according to the instructions of Example 13 and are worked up. About 3.7 g., corresponding to 49.8% of theory, of the benztriazole compound of formula (56)

are obtained in the form of a light beige powder of melting point 194 to 194.5° C. Two recrystallizations from ethanol with the aid of activated charcoal yield colorless glistening platelets which melt at 196 to 196.5° C. Analysis: $C_{20}H_{15}N_3$ (297.34). Calculated: C, 80.71; H, 5.09; N, 14.13. Found: C, 80.74; H, 482; N, 14.21.

If instead of benzalaniline 6.43 g. of diphenyl-(4)-aldehyde-anil are used, then the compound of the formula (57)

is obtained. Yield: 86.7% of theory. Pale greenish yellow glistening small needles from tetrachlorethylene. Melting point: 271 to 271.5° C. Analysis: $C_{26}H_{19}N_3$ (373.44). Calculated: C, 83.62; H, 5.13; N, 11.25. Found: C, 83.57; H, 5.22; N, 11.10.

Example 3

10.47 g. of 1-[benzoxazolyl-(2')]-4-methylbenzene of formula (58)

12.87 g. of diphenyl-(4)-aldehyde-anil and 25 g. of potassium hydroxide powder containing about 10% of water are stirred into 300 ml. of dimethylformamide with exclusion of air, during which a reddish brown coloration develops. The temperature is raised to 60° C. over the course of 30 minutes, and the mixture stirred for a further 30 minutes at this temperature and thereafter cooled to room temperature. Now 150 ml. of water and 250 ml. of 10% strength hydrochloric acid are successively added dropwise. The precipitated reaction product is filtered, washed with water until neutral and freed of a by-product by further washing with 600 ml. of methanol. After drying about 12.3 g., corresponding to 66.0% of theory, of 4-[benzoxazolyl-(2")]-4'-phenylstilbene of formula

(59) 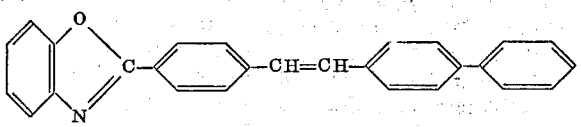

are obtained in the form of a light yellow powder which melts at 270 to 272° C. After three recrystallizations from o-dichlorobenzene with the aid of Fuller's earth about 8.4 g., corresponding to 45.2% of theory, of light yellow glistening platelets of melting point 276 to 276.5° C. are obtained. Analysis: $C_{27}H_{19}ON$ (373.43). Calculated: C, 86.84; H, 5.13; N, 3.75. Found: C, 86.78; H, 5.16; N, 3.83.

The 4-[aryloxazolyl-(2")]-4-phenylstilbene derivatives of formula

(60) 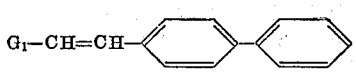

listed in the following table may be prepared in a similar manner.

| I | II, G₁ | III | IV | V | VI | VII | | |
|---|---|---|---|---|---|---|---|---|
| 61 | (structure) | 80.0 | 4 | 3 | 264–265 | C, 86.68<br>C, 86.85 | $C_{31}H_{27}ON$<br>H, 6.34<br>H, 6.11 | N, 3.26<br>N, 3.29 |
| 62 | (structure) | 77.0 | 5 | 9 | 238–238.5 | C, 87.95<br>C, 87.90 | $C_{36}H_{29}ON$<br>H, 5.94<br>H, 5.84 | N, 2.85<br>N, 2.75 |

TABLE—Continued

| I | II, G₁ | III | IV | V | VI | VII | | |
|---|---|---|---|---|---|---|---|---|
| 63 | | 69.0 | 7 | 6 | 294.5–295.5 | C₂₂H₁₅ON C, 88.17 H, 5.16 N, 3.12<br>C, 88.33 H, 5.26 N, 3.11 | | |
| 64 | | 70.3 | 7 | 9 | 284–284.5 | C₂₂H₁₅ON C, 88.17 H, 5.16 N, 3.12<br>C, 88.28 H, 5.04 N, 3.19 | | |
| 65 | | 77.6 | 5 | 3 | 294.5–295 | C₂₁H₁₇ON C, 86.79 H, 5.46 N, 3.62<br>C, 86.87 H, 5.46 N, 3.61 | | |
| 66 | | 78.4 | 4 | 9 | 280–280.5 | C₂₁H₁₇ON C, 86.79 H, 5.46 N, 3.62<br>C, 86.79 H, 5.50 N, 3.71 | | |
| 67 | | 82.7 | 5 | 9 | 306–308 | C₂₂H₁₉ON C, 86.75 H, 5.78 H, 3.49<br>C, 86.88 H, 5.86 H, 3.48 | | |
| 68 | | 50.6 | 5 | 8 | 213–213.5 | C₂₁H₁₇ON C, 86.79 H, 5.46 H, 3.62<br>C, 86.55 H, 5.46 H, 3.82 | | |
| 69 | | 82.5 | 5 | 3 | 201–202 | C₂₁H₁₇ON C, 86.79 H, 5.46 N, 3.62<br>C, 86.64 N, 5.53 N, 3.38 | | |
| 70 | —SO₂—NH—(CH₂)₇—CH₃ | 90 | 5 | 3 | 266–266.5 | C₂₈H₃₅O₃N₂S C, 74.44 H, 6.43 N, 4.96<br>C, 74.21 H, 6.18 N, 4.91 | | |
| 71 | | 72.7 | 7 | 7 | 259.5–260 | C₂₄H₁₇ON C, 87.91 H, 5.00 N, 3.31<br>C, 87.91 H, 5.11 N, 3.26 | | |
| 72 | | 9.48 | 11 | 9 | 279–279.5 | C₂₄H₁₇ON C, 87.91 H, 5.00 N, 3.31<br>C, 87.83 H, 4.99 N, 3.32 | | |

Example 4

5.23 g. of 1-[benzoxazolyl-(2′)]-4-methylbenzene of formula
(73)

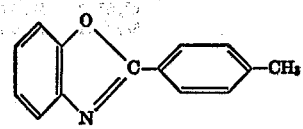

5.78 g. of naphth-(1)-aldehyde-anil and 12.5 g. of potassium hydroxide powder containing about 10% of water are stirred into 150 ml. of dimethylformamide with exclusion of air, during which first a wine-red and then a violet colour develops. The temperature is raised to 60° C. over the course of 30 minutes, and the mixture stirred for a further 30 minutes at this temperature and thereafter cooled to room temperature. Now 200 ml. of water and 140 ml. of 10% strength hydrochloric acid are successively added dropwise. The precipitated reaction product is cooled to 5° C., filtered, washed with water until neutral and freed of a by-product by a further washing with a little methanol. After drying about 7.73 g., corresponding to 89% of theory, of the compound of formula

(74) 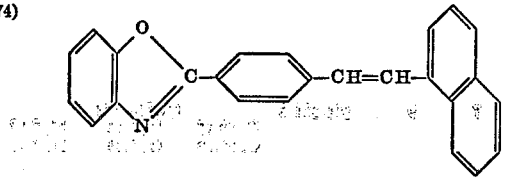

are obtained in the form of a brownish yellow powder. After chromatography on activated aluminium oxide in tetrachlorethylene and recrystallization from dioxane-ethanol pale greenish yellow glistening small needles and platelets of melting point 165 to 166° C. are obtained. Analysis: $C_{25}H_{17}ON$ (347.39). Calculated: C, 86.43; H, 4.93; N, 4.03. Found: C, 86.54; H, 4.91; N, 4.08.

The compounds of the formula

(75) 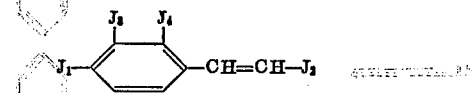

listed in the following table may be prepared in a similar manner.

| I | II¹ J₁ | J₂ | III | IV | V | VI | VII | | |
|---|---|---|---|---|---|---|---|---|---|
| 76 |  |  | 89.4 | 2/3 | 8 | 141–141.5 | $C_{29}H_{25}ON$<br>C, 86.32<br>C, 86.35 | H, 6.25<br>H, 6.17 | N, 3.47<br>N, 3.56 |
| 77 | 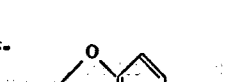 | Same as above. | 90.0 | 2/3 | 6 | 150.5–151 | $C_{31}H_{21}ON$<br>C, 87.91<br>C, 87.89 | H, 5.00<br>H, 5.26 | N, 3.31<br>N, 3.33 |
| 78 | 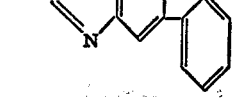 | ....do...... | 95.8 | 2/3 | 3 | 183–183.5 | $C_{31}H_{21}ON$<br>C, 87.91<br>C, 87.98 | H, 5.00<br>H, 4.81 | N, 3.31<br>N, 3.35 |
| 79 | 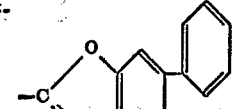 | ....do...... | 72.5 | 3 | 6 | 206.5–207 | $C_{29}H_{19}ON$<br>C, 87.63<br>C, 87.88 | H, 4.82<br>H, 4.99 | N, 3.52<br>N, 3.60 |
| 80 | 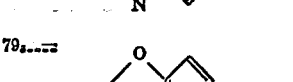 |  | 65.7 | 2/3 | 2 | 225–226 | $C_{25}H_{17}ON$<br>C, 86.43<br>C, 86.47 | H, 4.93<br>H, 5.18 | N, 4.03<br>N, 4.05 |
| 81 | 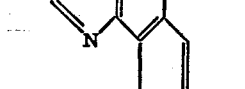 | Same as above. | 61.4 | 2/3 | 1 | 208–208.5 | $C_{29}H_{25}ON$<br>C, 86.32<br>C, 86.15 | H, 6.25<br>H, 6.30 | N, 3.47<br>N, 3.52 |
| 82 | 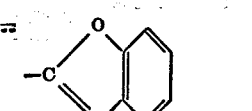 | ....do...... | 60.2 | 7 | 8 | 261–261.5 | $C_{31}H_{21}ON$<br>C, 87.91<br>C, 87.87 | H, 5.00<br>H, 5.06 | N, 3.31<br>N, 3.39 |
| 83 |  | ....do...... | 62.4 | 5 | 8 | 264–265 | $C_{31}H_{21}ON$<br>C, 87.91<br>C, 87.72 | H, 5.00<br>H, 5.03 | N, 3.31<br>N, 3.43 |

TABLE—Continued

| I | J₁ [II¹] | J₂ | III | IV | V | VI | VII | | |
|---|---|---|---|---|---|---|---|---|---|
| 84 | ![benzoxazolyl] | ...do... | 80.2 | 5 | 9 | 256–256.5 | C₂₃H₁₅ON C, 87.63 C, 87.88 | H, 4.82 H, 4.83 | N, 3.52 N, 3.58 |

¹ J₃, J₄=H.

| I | J₁ [II] | J₂ | J₃ | J₄ | III | IV | V | VI | VII | | |
|---|---|---|---|---|---|---|---|---|---|---|---|
| 85 | ![benzoxazolyl] | ![naphthyl] | H | —CH₃ | 95.7 | 5 | 9 | 168–168.5 | C₂₂H₁₅ON C, 86.40 C, 86.44 | H, 5.30 H, 5.30 | N, 3.88 N, 3.95 |
| 86 | Same as above | Same as above | —CH₃ | H | 90 | 2 | 9 | 144–144.5 | C₂₂H₁₅ON C, 86.40 C, 86.38 | H, 5.30 H, 5.22 | N, 3.88 N, 3.93 |

Example 5

7.24 g. of 1[benzthiaolyl-(2')]-4-methylbenzene of formula (87)

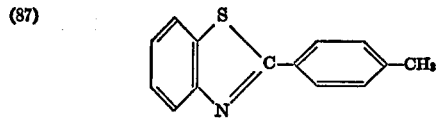

6.04 g. of benzalaniline and 16.7 g. of potassium hydroxide powder containing about 10% of water are stirred into 200 ml. of dimethylformamide with exclusion of air, during which a violet coloration develops. The temperature is raised to 60° C. over the course of 30 minutes, and the mixture is stirred for a further 30 minutes at this temperature and then cooled to room temperature. Now 100 ml. of water and 190 ml. of 10% strength hydrochloric acid are succesively added dropwise. The precipitated reaction product is filtered, washed with water until neutral and freed of a by-product by further washing with 300 ml. of methanol. After drying about 8.1 g., corresponding to 80.6% of theory, of 4-[benzthiazolyl-(2')]-stilbene of formula (88)

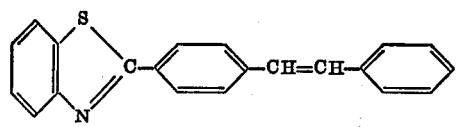

are obtained in the form of a light yellow powder which melts at 226 to 228° C. After three recrystallizations from tetrachloroethylene with the aid of Fuller's earth pale green very fine crystals of melting point 231 to 231.5° C. are obtained. Analysis: C₂₁H₁₅NS (313.43). Calculated: C, 80.48; H, 4.82; N, 4.47. Found: C, 80.39; H, 4.98; N, 4.49.

The 4-[benzothiazolyl - (2') - stilbene derivatives of formula (89)

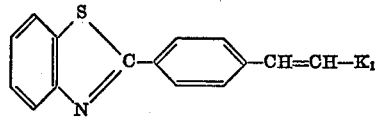

listed in the following table may be prepared in a similiar manner.

| I | II, K₁ | III | IV | V | VI | VII | | |
|---|---|---|---|---|---|---|---|---|
| 90 | —⟨⟩—Cl | 82.8 | 5 | 8 | 263.5–264 | C₂₁H₁₄NSCl C, 72.51 C, 72.60 | H, 4.06 H, 4.01 | N, 4.03 N, 3.95 |
| 91 | —⟨⟩—OCH₃ | 90.8 | 5 | 9 | 244.5–245 | C₂₂H₁₇ONS C, 76.94 C, 76.61 | H, 4.99 H, 5.01 | N, 4.08 N, 4.11 |
| 92 | —⟨⟩—⟨⟩ | 88.0 | 7 | 9 | 299–300 | C₂₇H₁₉NS C, 83.26 C, 83.33 | H, 4.92 H, 4.79 | N, 3.60 N, 3.41 |
| 93 | naphthyl | 92.5 | 2/3 | 6 | 145.5–146 | C₂₅H₁₇NS C, 82.61 C, 82.67 | H, 4.71 H, 4.75 | N, 3.85 N, 3.90 |
| 94 | naphthyl | 80.5 | 5 | 5 | 249.5–250 | C₂₅H₁₇NS C, 82.61 C, 82.38 | H, 4.71 H, 4.81 | N, 3.85 N, 3.92 |

Example 6

5.88 g. of 2-[4'-methylphenyl-(1/)]-5-phenyloxazole of formula

(95) 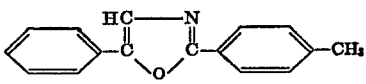

5.44 g. of benzalaniline and 12.5 g. of potassium hydroxide powder containing about 10% of water are stirred into 150 ml. of dimethylformamide with exclusion of air, during which a reddish violet coloration develops. The temperature is raised to 60° C. over the course of 30 minutes and the mixture stirred for a further 30 minutes at this temperature and then cooled to room temperature. Now 150 ml. of water and 130 ml. of 10% strength hydrochloric acid are successively added dropwise. The precipitated reaction product is filtered, washed with water until neutral and purified by further washing with 150 ml. of methanol. After drying about 6.2 g., corresponding to 76.8% of theory, of 2-[stilbenyl-(4')]-5-phenyloxazole of formula

(96) 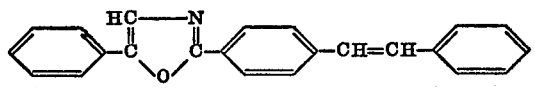

are obtained in the form of a pale yellow powder which melts at 154.5 to 155.5° C. Two recrystallizations from ethanol, with the aid of activated charcoal, yield pale green very fine glistening small needles and platelets of melting point 156 to 156.5° C. Analysis: $C_{23}H_{17}ON$ (323.37). Calculated: C, 85.42; H, 5.30; N, 4.33. Found: C, 85.51; H, 5.27; N, 4.35.

In a similar manner, 2-[4'-methylphenyl-(1')]-5-phenyloxazole of Formula 95 and 2-[4'-methylphenyl-1')-4,5-diphenyloxazole of formula

(97) 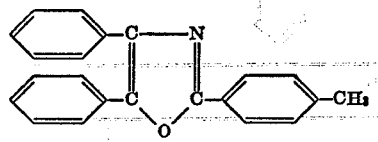

may be used to prepare the 2-[stilbenyl-(4')]-oxazole derivatives of formula

(98) 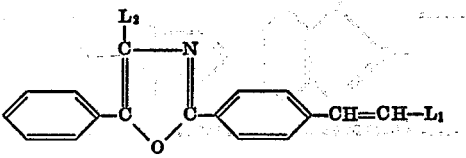

which are listed in the following table.

| I | L₁ | II | L₂ | III | IV | V | VI | VII | | |
|---|---|---|---|---|---|---|---|---|---|---|
| 99 | —⟨⟩—Cl | | H | 88.5 | 5 | 8 | 204–205 | $C_{22}H_1ONCl$ C, 77.20 C, 77.14 | H, 4.51 H, 4.56 | N, 3.91 N, 3.86 |
| 100 | —⟨⟩—OCH₃ | | H | 86.0 | 5 | 8 | 191.5–192.5 | $C_{24}H_{19}O_2N$ C, 81.56 C, 81.39 | H, 5.42 H, 5.47 | N, 3.96 N, 3.83 |
| 101 | —⟨⟩—CH(CH₃)₂ | | H | 86.5 | 2 | 2 | 142–142.5 | $C_{26}H_{23}ON$ C, 85.45 C, 85.33 | H, 6.34 H, 6.19 | N, 3.83 N, 3.98 |
| 102 | —⟨⟩—⟨⟩ | | H | 80.1 | 5 | 9 | 230–230.5 | $C_{29}H_{21}ON$ C, 87.19 C, 87.29 | H, 5.30 H, 5.35 | N, 3.51 N, 3.27 |
| 103 | naphthyl | | H | 88.0 | 11 | 9 | 169–169.5 | $C_{27}H_{19}ON$ C, 86.84 C, 87.09 | H, 5.13 H, 5.25 | N, 3.75 N, 3.70 |
| 104 | naphthyl | | H | 89.0 | 11 | 8 | 214.5–215 | $C_{27}H_{19}ON$ C, 86.84 C, 87.02 | H, 5.13 H, 5.28 | N, 3.75 N, 3.87 |
| 105 | —⟨⟩ | | —⟨⟩ | 85.1 | 5 | 3 | 181.5–182 | $C_{29}H_{21}ON$ C, 87.19 C, 87.36 | H, 5.30 H, 5.32 | N, 3.51 N, 3.69 |
| 106 | —⟨⟩—Cl | | Same | 84.0 | 5 | 9 | 206–207 | $C_{29}H_{20}ONCl$ C, 80.27 C, 80.02 | H, 4.65 H, 4.55 | N, 3.23 N, 3.51 |
| 107 | Cl—⟨⟩—Cl | | Same | 55.6 | 2 | 9 | 171.5–172 | $C_{29}H_{19}ONCl_2$ C, 74.37 C, 74.40 | H, 4.09 H, 4.19 | N, 2.99 N, 3.15 |
| 108 | —⟨⟩—OCH₃ | | Same | 69.0 | 5 | 9 | 182.5–183 | $C_{30}H_{23}O_2N$ C, 83.89 C, 84.01 | H, 5.40 H, 5.52 | N, 3.26 N, 3.16 |
| 109 | —⟨⟩—⟨⟩ | | Same | 92.5 | 5 | 9 | 255–255.5 | $C_{35}H_{25}ON$ C, 88.39 C, 88.69 | H, 5.30 H, 5.43 | N, 2.95 N, 3.01 |
| 110 | naphthyl | | Same | 87.1 | 2/3 | 6 | 159.5–160 | $C_{33}H_{23}ON$ C, 88.17 C, 88.22 | H, 5.16 H, 5.05 | N, 3.12 N, 3.10 |
| 111 | naphthyl | | Same | 86.2 | 5 | 9 | 202–202.5 | $C_{33}H_{23}ON$ C, 88.17 C, 88.07 | H, 5.16 H, 5.23 | N, 3.12 N, 3.09 |

Example 7

8.13 g. of 1-phenyl-2,5-di-[4'-methylphenyl-(1')]-1,3,4-triazole of formula (112)

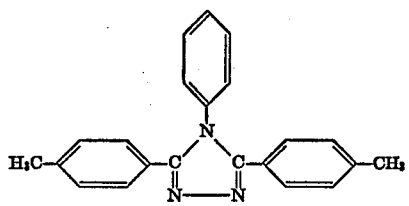

9.06 g. of benzalaniline and 25 g. of potassium hydroxide powder containing about 10% of water are stirred into 300 ml. of dimethylformamide with exclusion of air, during which a reddish brown coloration gradually develops. The temperature is raised to 60° C. over the course of 30 minutes, stirring continued for 30 minutes at this temperature, and the reaction mixture, which is now violet-red, thereafter cooled to room temperature and filtered. Now 100 ml. of water and 250 ml. of 10% strength hydrochloric acid are successively added dropwise. The precipitated reaction product is washed with a great deal of water and thereafter with 300 ml. of methanol, and is dried. About 11.3 g., corresponding to 90.0% of theory, of 1-phenyl-2,5-di-[stilbenyl-(4')]-1,3,4-triazole of formula (113)

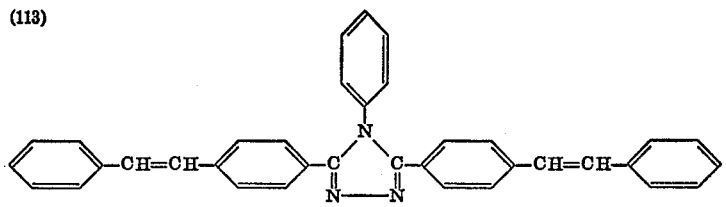

are obtained in the form of a practically colorless powder which melts at 333 to 339° C. After three recrystallizations from o-dichlorobenzene with the aid of Fuller's earth, colorless very fine felted small needles of melting point 343 to 344° C. are obtained. Analysis: $C_{36}H_{27}N_3$ (501.60). Calculated: C, 86.20; H, 5.43; N, 8.38. Found: C, 85.91; H, 5.53; N, 8.28.

In a similar manner 1-phenyl-2,5-di-[4'-methylphenyl-(1')]-1,3,4-triazole of Formula 112 5-phenyl-1,2,-di-[4'-methylphenyl-(1')]-1,3,4-triazole of formula (114)

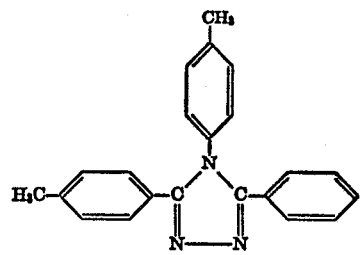

and 1,2,5-tri[4'-methylphenyl-(1')] - 1,3,4 - triazole of formula (115)

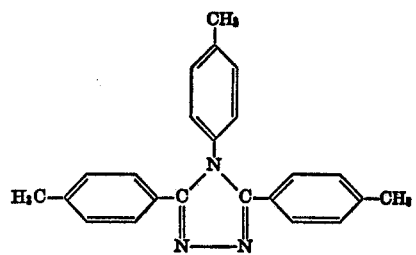

may be used to prepare the stilbenyl-1,3,4-triazole derivative of formula (116)

listed in the following table.

| I | II | | | III | IV | V | VI | VII | | |
|---|---|---|---|---|---|---|---|---|---|---|
| | $Q_1$ | $Q_2$ | $Q_3$ | | | | | | | |
| 117 | H | —CH=CH— ⌬—⌬ | ⌬—⌬ | 88.7 | 7 | 1 | >380 | C, 88.18<br>C, 87.93 | $C_{46}H_{31}N_3$<br>H, 5.40<br>H, 5.40 | N, 6.43<br>N, 6.52 |
| 118 | —CH=CH— ⌬ | H | ⌬ | 96.5 | 6 | 1 | 268–268.5 | C, 86.20<br>C, 85.91 | $C_{36}H_{27}N_3$<br>H, 5.43<br>H, 5.55 | N, 8.38<br>N, 8.42 |

TABLE—Continued

| I | II Q₁ | Q₂ | Q₃ | III | IV | V | VI | VII | | |
|---|---|---|---|---|---|---|---|---|---|---|
| 119 | —CH=CH— | H | *p-biphenyl* | 85.6 | 7 | 1 | 296–297 | $C_{45}H_{33}N_3$ | | |
| | | | | | | | | C, 88.18 | H, 5.40 | N, 6.43 |
| | | | | | | | | C, 87.99 | H, 5.53 | N, 6.49 |
| 120 | —CH=CH— | —CH=CH— | *phenyl* | 92.5 | 4 | 5 | 276–276.5 | $C_{41}H_{31}N_3$ | | |
| | | | | | | | | C, 87.53 | H, 5.51 | N, 6.96 |
| | | | | | | | | C, 87.42 | H, 5.47 | N, 7.08 |
| 121 | —CH=CH— | —CH=CH— | *p-biphenyl* | 95.5 | 7 | 5 | 365–366 | $C_{53}H_{39}N_3$ | | |
| | | | | | | | | C, 89.50 | H, 5.45 | N, 5.05 |
| | | | | | | | | C, 89.23 | H, 5.55 | N, 5.19 |
| 122 | —CH=CH— (p-Cl-phenyl) | —CH=CH— (p-Cl-phenyl) | *p-Cl-phenyl* | 87.5 | 11 | 6 | 279.5–280.5 | $C_{41}H_{28}N_3Cl_3$ | | |
| | | | | | | | | C, 74.74 | H, 4.28 | N, 5.94 |
| | | | | | | | | C, 74.71 | H, 4.20 | N, 6.01 |
| 123 | —CH=CH— (p-OCH₃-phenyl) | —CH=CH— (p-OCH₃-phenyl) | *p-OCH₃-phenyl* | 95.2 | 7 | 9 | 260–260.5 | $C_{47}H_{39}O_3N_3$ | | |
| | | | | | | | | C, 81.36 | H, 5.67 | N, 6.06 |
| | | | | | | | | C, 81.31 | H, 5.66 | N, 5.99 |
| 124 | —CH=CH— (1-naphthyl) | —CH=CH— (1-naphthyl) | *1-naphthyl* | 95.5 | 11 | 6 | 296.5–297 | $C_{53}H_{37}N_3$ | | |
| | | | | | | | | C, 89.21 | H, 5.21 | N, 5.57 |
| | | | | | | | | C, 88.96 | H, 5.26 | N, 5.55 |
| 125 | —CH=CH— (1-naphthyl) | —CH=CH— (1-naphthyl) | *1-naphthyl* | 92.4 | 7 | 5 | 319–319.5 | $C_{53}H_{37}N_3$ | | |
| | | | | | | | | C, 89.21 | H, 5.21 | N, 5.57 |
| | | | | | | | | C, 88.92 | H, 5.21 | N, 5.83 |

Example 8

8.13 g. of 1-phenyl-3,5-di-[4′-methylphenyl-(1′)]-1,2,4-triazole of formula (126)

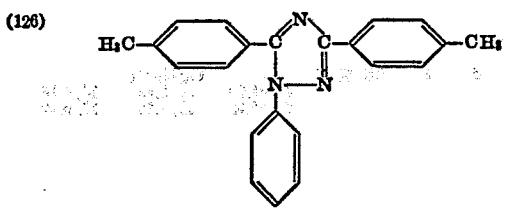

9.06 g. of benzalaniline and 25 g. of potassium hydroxide powder containing about 10% of water are reacted with 300 ml. of dimethylformamide according to the instructions of Example 26. About 11.4 g., corresponding to 91% of theory, of 1-phenyl-3,5-di-[stilbenyl-(4')]-1,2,4-triazole of formula (127)

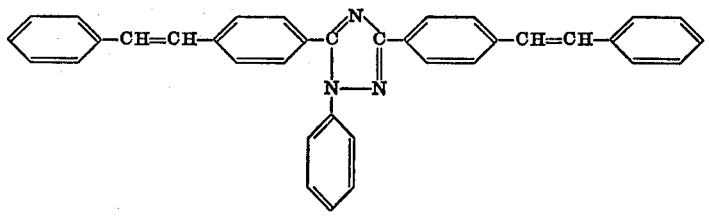

are obtained in the form of a greenish yellow powder. Three recrystallizations from xylene/n-hexane with the aid of Fuller's earth yield about 2.7 g., corresponding to 21.6% of theory, of fine colorless small needles of melting point 219.5 to 220° C. Analysis: $C_{36}H_{27}N_3$ (501.60). Calculated: C, 86.20; H, 5.43; N, 8.38. Found: C, 86.17; H, 5.55; N, 8.29.

In a similar manner, 1-phenyl-3,5-di-[4" - phenylstilbenyl-(4')]-1,2,4-triazole of formula.

(128)

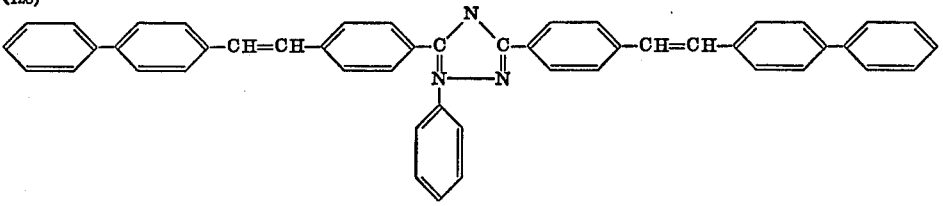

is obtained from 12.87 g. of diphenyl-(4)-aldehyde-anil. Yield: 90.5% of theory. Pale beige-yellow very fine crystals from dimethylformamide. Melting point: 315 to 317° C. Analysis: $C_{48}H_{35}N_3$ (655.78). Calculated: C, 88.18; H, 5.40; N, 6.43. Found: C, 88.29; H, 5.53; N, 6.45.

Example 9

9.66 g. of 1,4,5-triphenyl-2-[4'-methyl-phenyl-(1')]-imidazole of formula (129)

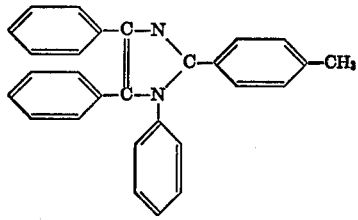

6.46 g. diphenyl-(4)-aldehyde-anil and 12.5 g. of potassium hydroxide powder containing about 10% water are stirred into 200 ml. of dimethylformamide with exclusion of air. The temperature is raised to 90° C. over the course of 30 minutes, during which a red coloration gradually develops. The reaction mixture is stirred for a further 30 minutes at 90 to 95° C. and then cooled to room temperature. Now 200 ml. of water and 110 ml. of 10% strength hydrochloric acid are successiively added dropwise, with cooling. The precipitated reaction product is filtered off, washed with a great deal of water and then with 400 ml. of methanol and dried. About 8.0 g., corresponding to 58.2% of theory, of 1,4,5-triphenyl-2-[4"-phenyl-stilbenyl-(4')]-imidazole of formula (130)

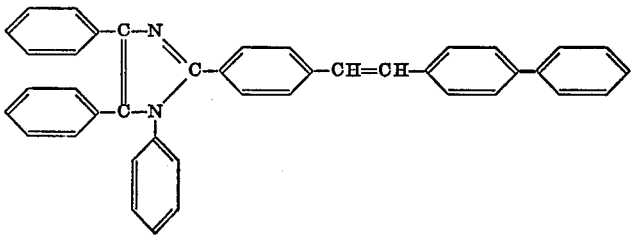

are obtained in the form of a light yellow powder which melts at 307 to 308° C. Three recrystallizations from o-dichlorobenzene, with the aid of Fuller's earth, yield 6.2 g. corresponding to 45.1% of theory, of light greenish yellow felted small needles of melting point 308 to 308.5° C. Analysis: $C_{41}H_{30}N_2$ (550.67). Calculated: C, 89.42; H, 5.49; N, 5.09. Found: C, 89.35; H, 5.52; N, 4.96.

In a similar manner the 1,4,5-triphenyl-2-[4'-methylphenyl-(1')]-imidazole of formula (129) the 2,4,5-triphenyl-1-[4'-methylphenyl-(1')]-imidazole of formula (131)

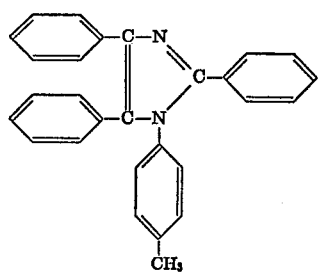

and the 4,5-diphenyl-1,2-di[4'-methyl-phenyl-(1')]-imidazole of formula (132)

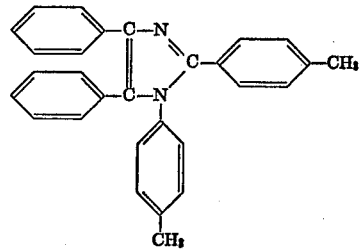

may be used to prepare the stilbenyl-imidazole derivatives of formula

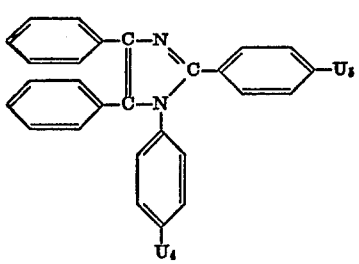

which are listed in the following table.

in this way has a substantially white appearance than the untreated material.

Example 11

100 parts of polyester granules of terephthalic ethyleneglycolpolyester are intimately mixed with 0.05 part of one of the stilbene derivatives of Formulae 49, 50 to 54, 56, 57, 59, 61 to 72, 74, 76 to 86, 101, 102 to 111, 117, 121, 130 and 134 to 137 and melted at 285° C. whilst stirring. When the spinning melt is spun through conventional spinnerets, powerfully brightened polyester fibres are obtained.

The above mentioned compounds may also be added to the starting substances before or during the polycondensation to the polyester.

| I | II | | III | IV | V | VI | VII | | |
|---|---|---|---|---|---|---|---|---|---|
| | $U_4$ | $U_5$ | | | | | | | |
| 134 | H | —CH=CH—⌬ | 44.7 | 5 | 5 | 253–253.5 | $C_{35}H_{26}N_2$ | C, 88.57 H, 5.52 N, 5.90 | C, 88.77 H, 5.61 N, 6.00 |
| 135 | H | —CH=CH—(naphthyl) | 70.3 | 2/3 | 5 | 230.5–231.5 | $C_{39}H_{28}N_2$ | C, 89.28 H, 5.38 N, 5.34 | C, 89.53 H, 5.51 N, 5.44 |
| 136 | —CH=CH—(biphenyl) | H | 54.5 | 5 | 2 | 226.5–227 | $C_{41}H_{30}N_2$ | C, 89.42 H, 5.49 N, 5.09 | C, 89.60 H, 5.66 N, 5.30 |
| 137 | —CH=CH—⌬ | —CH=CH—⌬ | 63.8 | 2/3 | 3 | 234 | $C_{43}H_{32}N_2$ | C, 89.55 H, 5.59 N, 4.86 | C, 89.37 H, 5.58 N, 5.00 |
| 138 | —CH=CH—(biphenyl) | —CH=CH—(biphenyl) | 73.7 | 11 | 9 | 285.5–286 | $C_{55}H_{40}N_2$ | C, 90.63 H, 5.53 N, 3.84 | C, 90.74 H, 5.55 N, 4.12 |
| 139 | H | —CH=CH—(naphthyl) | 53.4 | 11 | 5 | 274.5–275 | $C_{39}H_{28}N_2$ | C, 89.28 H, 5.38 N, 5.34 | C, 89.24 H, 5.52 N, 5.23 |

Example 10

A polyester fabric (e.g. "Dacron") is padded at room temperature (about 20° C.) with an aqueous dispersion containing per litre 2 g. of one of the compounds of Formulae 49, 50 to 54, 56, 57, 59, 61 to 72, 74, 76 to 86, 101, 102 to 111, 117, 121, 130 and 134 to 137 as well as 1 g. of an addition product of about 8 mols of ethylene oxide with 1 mol of para-tert.-octylphenol, and dried at about 100° C. The dry material is subsequently subjected to a heat treatment which lasts from 2 minutes to a few seconds depending on the temperature. The material treated

Example 12

10,000 parts of polyamide chips prepared in the known manner from hexamethylenediaminadipate are mixed for 12 hours in a tumbling vessel with 30 parts of titanium dioxide (rutile modification) and 2 parts of the compounds of Formulae 49, 50 to 54, 56, 57, 59, 61 to 72, 74, 76 to 86, 101, 102 to 111, 117, 121, 130 and 134 to 137. The chips treated in this manner are melted in a boiler—after it has been swept with superheated steam to displace the atmospheric oxygen—which is heated with oil or diphenyl vapour to a temperature of 300 to 310° C., and stirred for half an hour. The melt is hereupon expressed through a spinneret under nitrogen pressure of 5 atmospheres (gauge), and the thus spun, cooled filament wound onto a spinning bobbin. The resulting threads have an excellent brightening effect.

Example 13

100 g. of polypropylene "Fibre-Grade" are intimately mixed with 0.02 g. of the compounds of Formulae 49, 50 to 54, 56, 57, 59, 61 to 72, 74, 76 to 86, 101, 102 to 111, 117, 121, 130 and 134 to 137 respectively, and melted, whilst stirring, at a temperature of 280 to 290° C. When the melt is spun through conventional spinnerets and stretched, polypropylene fibres of excellent brightening effect which are fast to light are obtained.

What is claimed is:

1. A compound of the formula

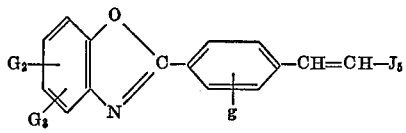

in which $G_2$ denotes hydrogen, an alkyl group having 1 to 4 carbon atoms, a phenyl group, a phenylalkyl group with 1 to 4 carbon atoms in the alkyl group or halogen or a sulphonamido, $G_3$ represents hydrogen or an alkyl group or may together with an adjacent residue $G_2$ and the benzene ring on which these G-residues are carried, form a naphthalene ring, $g$ represents hydrogen and $J_5$ and in which terminal phenyl or naphthyl groups may further contain 1 to 3 alkyl groups, 1 to 2 halogen atoms or an alkoxy group.

2. A compound of the formula

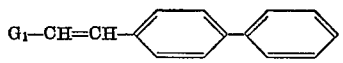

wherein $G_1$ represents 4 - (benzoxazolyl-2)-phenyl or 4-(naphthoxazolyl-2)phenyl, wherein the 4-(benzoxabolyl-2) phenyl is unsubstituted or substituted in position 5 by phenyl, methyl, isopropylphenyl, or tert.butyl, and in position 6 by phenyl or methyl.

3. A compound of the formula

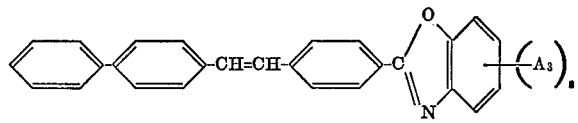

in which $A_3$ represents hydrogen, an alkyl group having 1 to 18 carbon atoms or halogen and $s$ denotes an integer of 1 to 3.

4. A compound of the formula

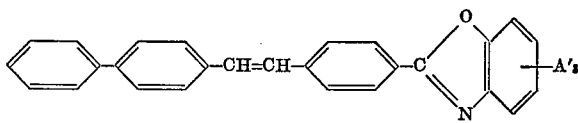

in which $A_3'$ denotes phenyl or phenylalkyl with 1 to 4 carbon atoms in the alkyl moiety.

5. A compound of claim 3 having the formula

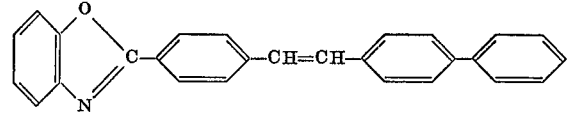

6. A compound of claim 3 having the formula

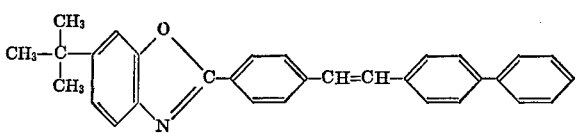

References Cited

UNITED STATES PATENTS

| | | | |
|---|---|---|---|
| 3,133,916 | 5/1964 | Duennenberger et al. | 260—240 CA |
| 3,577,411 | 5/1971 | Miechti et al. | 260—240 CA |

FOREIGN PATENTS

| | | | |
|---|---|---|---|
| 1,378,455 | 10/1964 | France | 260—240 CA |

OTHER REFERENCES

Netherlands Published Application, page 1 and 1 page of the drawings cited, published May 2, 1967.

Chemical Abstracts, vol. 68, pages 2119 to 2120 (abstract No. 21961h) (1968).

Drefahl et al., Chem. Ber. vol. 93, pages 492 to 497 (1960).

JOHN D. RANDOLPH, Primary Examiner

U.S. Cl. X.R.

96—1R; 106—124, 148, 176; 117—33.5 T; 252—152, 301.2 W, 543; 260—2 S, 46.5, 47 EP, 63 FP, 73 L, 75 N, 77.5 D, 78 R, 78.5 T, 79, 79.7, 80.3 R, 248 CS, 250 A, 251 Q, 283 R, 290 R, 302 R, 304, 307 D, 308 B, 309, 309.2, 310 R, 566 B, 762

UNITED STATES PATENT OFFICE
CERTIFICATE OF CORRECTION

Patent No. 3,781,278  Dated December 25, 1973

Inventor(s) Adolf Emil Siegrist et al

It is certified that error appears in the above-identified patent and that said Letters Patent are hereby corrected as shown below:

Column 2, line 10, the first formula of the series should read:

--- 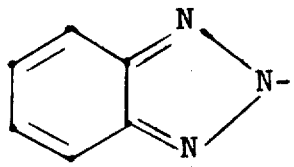 ---;

the third formula of the series should read:

--- 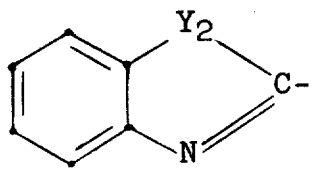 ---;

lines 50-51, delete "$X_3$ and $X_4$ denote branched alkyl groups, or one of the substituents".

Column 5, the right-hand portion of formula (14) should read:

--- 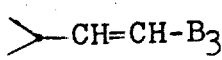 ---.

Column 14, line 3, before "(see", "are" should be --- art ---; in the table under "II, $B_3$", formula 51 should read:

--- 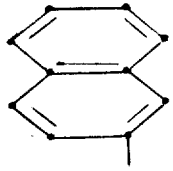 ---.

UNITED STATES PATENT OFFICE
CERTIFICATE OF CORRECTION

Patent No. 3,781,278                Dated December 25, 1973

Inventor(s) Adolf Emil Siegrist et al

It is certified that error appears in the above-identified patent and that said Letters Patent are hereby corrected as shown below:

Column 15, the left-hand portion of each of formulae (56) and (57) should read:

---  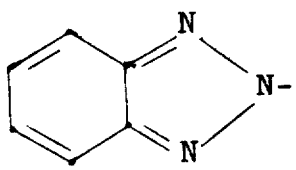  ---.

Column 16, in the first table under "VII", line 6, "Hk" should be --- H ---;  in the second table under "VII", line 3, "C,86.86" should be --- C,86.83 ---.

Column 18, in the table under "VI", line 1, "259.5" should be --- 295.5 ---;  in the table under "VII", line 13, "H,5.86" should be --- H,5.85 ---;  in the table under "III", line 10, "9.48" should be --- 94.8 ---.

Column 21, in the first table under "$J_1$", the lower portion of formula 84 should read:

---  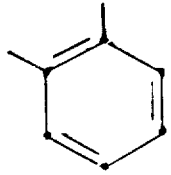  ---; in the second table under "$J_2$", the right-hand portion of formula 85 should read:

---  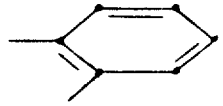  ---;

line 30, "benzthiaolyl" should be --- benzthiazolyl ---.

PO-1050
(5/69)

UNITED STATES PATENT OFFICE
CERTIFICATE OF CORRECTION

Page 3

Patent No. 3,781,278            Dated December 25, 1973

Inventor(s) Adolf Emil Siegrist et al

It is certified that error appears in the above-identified patent and that said Letters Patent are hereby corrected as shown below:

Column 22, in the first table under "III", line 1, "80.2" should be --- 80.5 ---.

Column 23, line 1, "(1/)" should be --- (1') ---.

Column 24, in the table under "VII", line 1, "$H_1$" should be --- $H_{16}$ ---.

Column 25, in the table under "$Q_2$", the lower portion of formula 117 should read:

--- 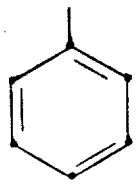 ---.

Column 27, in the table under "$Q_1$", the left-hand portion of formula 124 should read:

--- 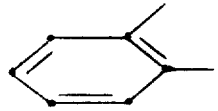 ---; in the table under "$Q_2$", the left-hand portion of formula 124 should read:

--- 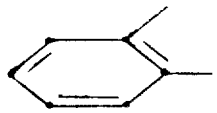 ---;

in the table under "$Q_3$", formula 125 should read:

UNITED STATES PATENT OFFICE
CERTIFICATE OF CORRECTION

Patent No. 3,781,278     Dated December 25, 1973

Inventor(s) Adolf Emil Siegrist et al

It is certified that error appears in the above-identified patent and that said Letters Patent are hereby corrected as shown below:

Column 29, the center portion of formula (129) should read:

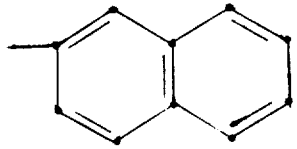

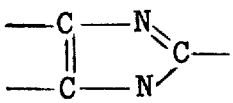

Column 32, line 1, "white" should be --- whiter ---; in the table under "VII", line 4, "H$_{38}$" should be --- H$_{28}$ ---.

Column 33, line 27, delete "or a sulphonamido"; line 30, after "J$_5$" insert --- denotes a p-diphenyl, 1-naphthyl or 2-naphthyl group, ---; line 39, "benzoxabolyl" should be --- benzoxazolyl ---.

Column 34, the left-hand portion of the formula of claim 6 should read:

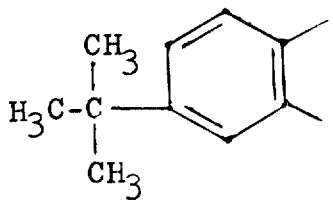

Signed and sealed this 29th day of October 1974.

(SEAL)
Attest:

McCOY M. GIBSON JR.
Attesting Officer

C. MARSHALL DANN
Commissioner of Patents